United States Patent Office 3,303,808
Patented Feb. 14, 1967

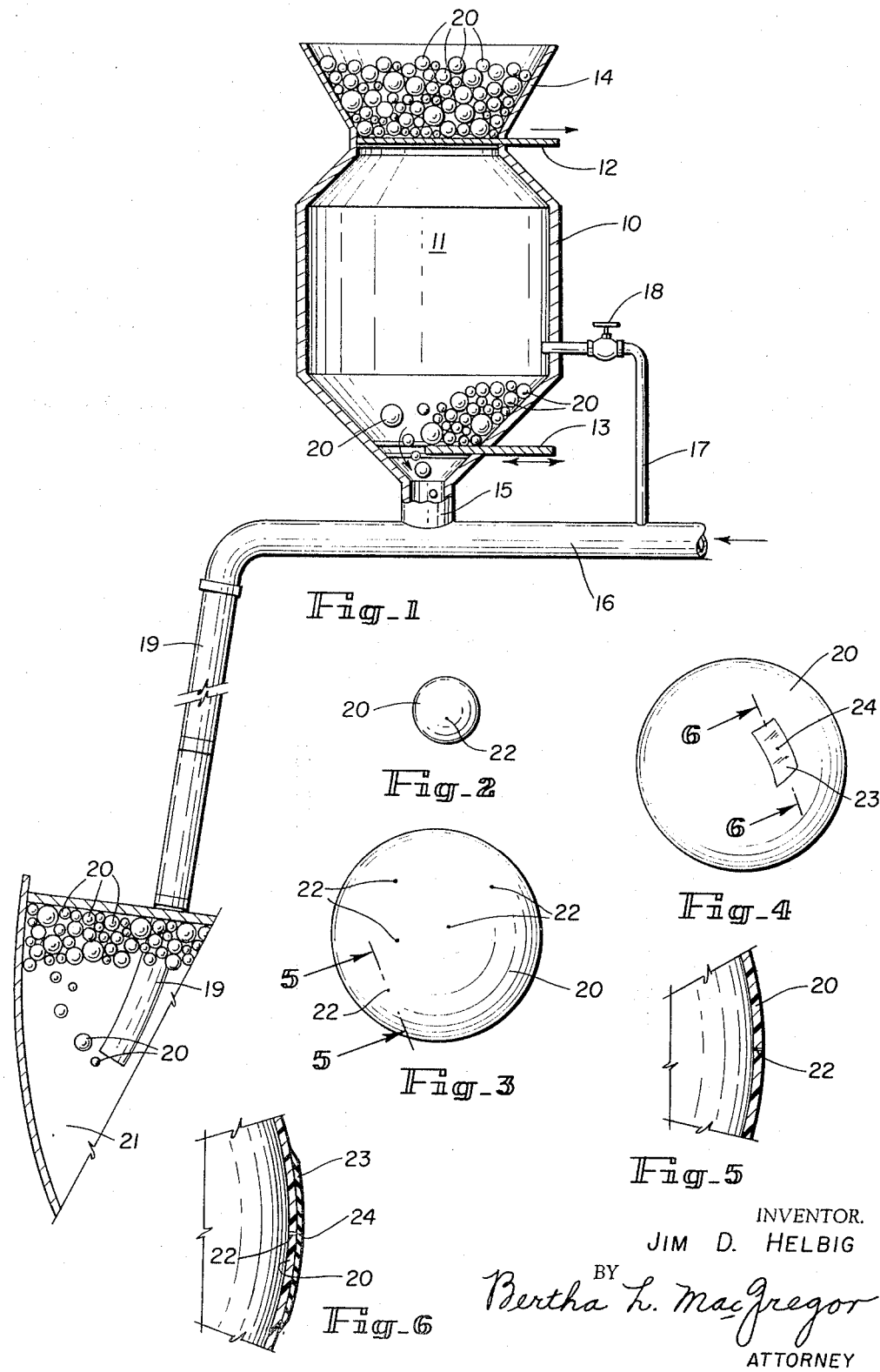

3,303,808
APPARATUS FOR RAISING SUBMERGED
VESSELS
Jim D. Helbig, Brighton, Colo.
(3816 Dahlia St., Denver, Colo. 80207)
Filed Oct. 18, 1965, Ser. No. 496,851
6 Claims. (Cl. 114—52)

This invention relates to apparatus for raising submerged vessels, and particularly to apparatus efficient for raising vessels submerged in very deep water as well as in water of shallower depths.

Sealed balls and other sealed containers have been employed as buoyant means for raising submerged hulls, and various types of apparatus have been used for conveying such sealed elements from surface craft to the sunken vessel for the purpose of displacing sufficient water from the hull to cause the buoyant elements to lift the sunken ship to the surface. Such devices can be used successfully to raise vessels submerged in relatively shallow water, where the water pressure is insufficient to crush the sealed balls or other sealed containers. However, when a vessel is submerged in deep water, for example, 400 feet below surface, the water pressure is in excess of 160 p.s.i. In order to withstand crushing of the buoyant elements by the external pressure thereon in deep water, the balls or other containers must be made of heavy gauge metal or other material capable of resisting high pressures, but due to their own weight their efficiency as buoyant elements is limited, and their cost is prohibitive.

Pontoons and other inflatable bodies also have been used as the buoyant devices for raising submerged hulls. In order to equalize the internal and external pressures to which such devices are exposed during the raising operations, they have been provided with valves for intake of pressurized air for resisting crushing due to external water pressure, and for discharge of air to prevent explosion due to excessive internal pressure in the valved elements when rising to lesser water depths where the external pressure gradually decreases.

Such valved devices are inefficient due to likelihood of mechanical failures, difficulty of control from a surface craft, and high cost.

The main object of my invention is to provide apparatus for raising submerged vessels comprising a plurality of valveless buoyant hollow containers, spherical or other form, having walls impervious to air and water, provided with means whereby automatic equalizing of internal and external pressures is achieved.

Another object of the invention is to provide apparatus efficient for its intended purpose to raise sunken vessels submerged in deep water as well as in relatively shallow water.

Another object of the invention is to provide apparatus for the purpose stated which functions efficiently during the raising operation notwithstanding temporary variations in external water pressures due to wave action of the water.

Hollow containers useful in my apparatus may be spherical or of other shape, and may vary in size. They may be made of plastic material or metal, preferably light weight material. Containers of different sizes and shapes may be used together. Each container is provided with a very small aperture which extends through the container wall, but is otherwise closed. Small containers, such as Ping-pong balls, are provided with one aperture each, whereas larger containers may be provided with two or more apertures. Each aperture, regardless of the number, is very small, having the diameter of a hair, or on the order of $\frac{1}{1000}$ inch. The apertures may be round or elongated, but so small that while air can pass through the aperture in either direction, at a given pressure, water cannot pass therethrough at the same pressure. I have found that the minute opening or openings formed in containers of my invention allow the transfer of a gas at a given pressure, but at the same pressure water cannot pass through the opening or openings. This is due to the surface tension, viscosity and adhesion of the liquid to the surface defining the opening in the container. Depending on the nature of the material used in the containers, and the size of the hole or holes, some differential in external and internal pressures is required in order to obtain a transfer of either air or water through the hole or holes.

Other objects and advantages of the invention will become apparent from the drawings and the following specification.

In the drawings:

FIG. 1 is a vertical sectional view, partly in elevation, of apparatus embodying my invention.

FIG. 2 is an elevational view showing a spherical container, such as a Ping-pong ball provided with a very small aperture, used as a buoyant element in my apparatus.

FIG. 3 is an elevational view showing another container, larger than that of FIG. 2, provided with a plurality of very small apertures.

FIG. 4 is an elevational view of a modified form of container in which the container wall is provided with a patch made of rubber or other suitable material, and registering apertures extend through the wall and patch.

FIG. 5 is a sectional view, enlarged, in the plane of the line 5—5 of FIG. 3.

FIG. 6 is a sectional view, enlarged, in the plane of the line 6—6 of FIG. 4.

In that embodiment of the invention shown in the drawings, a high pressure housing 10 encloses a pressure chamber 11, closed at its top by a slide valve 12 and at its bottom by a slide valve 13. Above the slide valve 12 is a hopper 14. Below the slide valve 13, the chamber 11 communicates with a coupling 15 leading into a pressurized air conduit 16. The pressurized conduit 16 also communicates with the pressure chamber 11 by an air line 17 connected to the conduit 16 and the housing 10. Line 17 is provided with a control valve 18. The conduit 16 is connected to a conduit 19 which conveys buoyant elements 20 to a submerged vessel 21.

The buoyant elements 20 may be small, like a Ping-pong ball, or as large as desired, and may be spherical or other shape. If small, one aperture 22 will suffice, as shown in FIG. 2. A plurality of apertures 22 may be provided in larger containers, as shown in FIG. 3. The apertures are very small, approximately $\frac{1}{1000}$ inch. The sectional view of FIG. 5 is greatly enlarged. The aperture is so minute that air can pass in either direction, but water cannot pass when internal and external pressures are substantially equal. As shown in FIGS. 4 and 6, a patch of rubber or rubber-like material 23 may be applied to the surface of a container 20 and pierced to provide registering apertures 22, 24 through the container wall and patch. The rubber-like material tends to creep into the opening 24 when the piercing instrument is withdrawn, but unequal internal and external pressures will result in passage of air from the high pressure side to the lesser pressure side of the container.

The apparatus shown in FIG. 1 is carried by a surface craft to the area above the submerged vessel 21, and the conduit 19 is lowered and its free end placed into the hull to be raised. The conduit 19 is flexible and large enough to permit buoyant elements 20 to pass therethrough.

In operation conduit 16 is connected to a source of compressed air and when the proper pressure is applied the air will flow continuously through conduits 16 and 19 and discharge into the hull of the ship at the lower end of conduit 19. The pressure that must be applied to conduit 16 is determined entirely by the depth of the discharge end of conduit 19 below the surface of the water. The pressure in conduit 16 must be greater than the pressure of the water at the discharge end of conduit 19. First the pressure must be equal to the pressure of the water at the lower end of conduit 19 but must also have sufficient pressure left to cause a flow of air through 16 and 19 and overcome the friction losses in these conduits. After a continuous flow of air has been established through conduits 16 and 19 the buoyant elements 20 are placed in the hopper 14 under ordinary atmospheric conditions. The slide valve 12 is opened to permit elements 20 to fall into the pressure chamber 11 and then closed. The chamber 11 is supplied with pressurized air through conduit 16 and line 17. The pressure required for chamber 11 is equal to the pressure in conduit 16 which has already been determined by the depth of the discharge end of conduit 19. This can be calculated by allowing .433 p.s.i. for each foot of depth to the discharge end of conduit 19 (approximately .444 p.s.i. for sea water). If the submerged vessel lies 300 feet below the surface, the discharge end of conduit 19 would of necessity be at the same depth and the pressure required would be approximately 130 p.s.i. In order to protect the buoyant elements from the effects of temporary increases in external pressures resulting from wave action of the water during the raising operation which might cause the introduction of small amounts of water into the buoyant elements, it is desirable to provide for what may be termed a pressure or time "lag." This is done automatically when chamber 11 is put under pressure equal to conduit 16 which of necessity must be somewhat (approximately 5 lbs.) higher than the pressure at the discharge end of 19.

The pressure in chamber 11 is slowly increased by the use of valve 18 until it is equal to the pressure in conduit 16. This allows air to pass into the buoyant elements through the minute apertures until the pressure inside is essentially the same as the pressure outside the elements which of course will be the same as in conduit 16. If the pressure in chamber 11 is increased too rapidly before the elements have time to equalize their internal pressure, the elements would collapse. Then the elements of the treated batch are allowed to drop into the conduit 16 by opening valve 13. The conduit 16 is supplied with air from an adequate source so that the internal pressure in elements 20 is maintained while the elements are carried downward into the conduit 19 and discharged into the vessel 21 by the flow of compressed air which has already been established through 16 and 19. After the elements discharge from the end of conduit 19 they will rise as permitted by the structure and displace water in the hull. Excess air which carries the elements downwardly through conduits 16 and 19 escapes in the hull and then leaks away through cracks or other openings.

The described procedure thus places the buoyant elements in the submerged hull under conditions wherein the internal pressure of the elements is at least equal to and preferably slightly greater than the external water pressure at the depth of the sunken ship. In order to prevent explosion of the buoyant elements during the raising operation, when the external pressure becomes gradually less, it is necessary for the pressurized air in the elements to pass out through the aperture or apertures to substantially equalize the internal and external pressures, but the initial excess pressure of a few pounds within the elements 20 is not sufficient to produce explosion and also serves to prevent intake of water which otherwise might occur during temporary periods of increased external pressure produced by wave action of the water.

During the raising of the submerged hull by the floating action of the buoyant elements, the pressurized air in the elements gradually passes out through the apertures 22 or 22–24 until the vessel reaches surface and the internal and external pressures are essentially equalized at atmospheric pressure or slightly greater since most of the hull and most of the buoyant elements would still be a few feet under water, depending on the size of the hull.

When sealed balls or other containers are employed in raising operations, their use is limited to relatively shallow depths due to the crushing effect of the water pressures at greater depths. Further, when such sealed containers successively rise in the submerged hull, as permitted by the structure thereof, the incoming containers bear against and exert pressure on those which have previously risen as far as possible within the vessel. The cumulative effect of the external water pressure on the sealed containers, together with the pressure of the increasing number of containers against those above them in the hull, results in crushing of the buoyant elements and failure of the raising operation. Crushing of the buoyant elements of my invention under similar conditions is avoided due to the provision for automatic approximate equalization of internal and external pressures through the minute openings herein described.

From the foregoing it will be apparent that prior art sealed buoyant elements are subject to crushing by excessive external pressures, or are necessarily of such crush-resisting construction that their buoyancy is insufficient for their intended purposes. Chemicals have been employed to produce foam in submerged vessels. To be effective as buoyant non-water-absorbing bodies, the air containing cells must closed in the foam making operation which is performed under pressure. When such foam cells rise upwardly through the water, there is no means for reducing the internal pressure in the cells, and consequently individual cells burst in response to the explosive effect of the air within them. Therefore the vessel raising operation fails even though the foam may serve temporarily to lift the sunken ship. Open cell structures, such as synthetic sponges and the like, obviously absorb water and thus become useless for raising submerged objects. Another advantage of buoyant elements over foam is the fact that these elements can be reused indefinitely for raising hulls whereas this would not be possible with foam. Also, if the hull were to be refurbished or salvaged the removal of the buoyant elements obviously would be much easier than the removal and cleanup of plastic foam. All these objections to prior art devices for raising sunken vessels have been obviated by my invention.

Changes may be made in the form and arrangement of parts of the apparatus, and in the form, size and materials of the buoyant elements of my invention, without departing from the scope of the invention as defined by the appended claims. For example, I have illustrated herein the batch method of pressurizing the elements 20 in the pressure chamber 11, but obviously the desired results can be attained by combining the chamber 11 and pressure conduit 16–19 so that pressurized air passes into the elements 20 as they travel continuously through said conduits, the speed of travel being controlled to provide time for pressurized air to pass into the elements 20 to the extent required to equalize the predetermined internal and external pressures.

I claim:

1. Apparatus for raising submerged vessels comprising
(a) a plurality of buoyant valveless hollow elements having walls impervious to air and water, each provided with a very small aperture through which air passes automatically into the elements when the air pressure is greater externally than internally of the elements and passes automatically out of the elements when the pressure is greater internally than externally of the elements, but through which water cannot pass when pressures internal and external of the elements are substantially equal, (b) a walled pressure chamber containing said elements and air pressurized to a predetermined pressure at least equal to the water pressure at the depth of the submerged vessel to be raised for automatically causing said pressurized air to pass into the buoyant elements through said apertures until their internal and external pressures are approximately equal, and (c) means conveying the buoyant elements into the submerged vessel while maintaining said pressures.

2. The apparatus defined by claim 1, in which the buoyant elements are provided with very small apertures of approximately $\frac{1}{1000}$ inch diameter.

3. The apparatus defined by claim 1, in which the buoyant elements are provided with patches of resilient material, and the element walls and patches are provided with very small registering apertures.

4. The apparatus defined by claim 1, in which the air in the pressure chamber is pressurized to a predetermined pressure slightly in excess of the water pressure at the depth of the submerged vessel to be raised.

5. The apparatus defined by claim 1, in which the buoyant elements differ in size, and each of the smallest elements is provided with a single very small aperture and each of the larger elements is provided with a plurality of very small apertures.

6. Apparatus for raising submerged vessels comprising (a) a plurality of buoyant valveless hollow elements having walls impervious to air and water, each provided with a very small aperture through which air passes automatically into the elements when the air pressure is greater externally than internally of the elements and passes automatically out of the elements when the pressure is greater internally than externally of the elements, but through which water cannot pass when pressures internal and external of the elements are substantially equal, (b) a housing enclosing a pressure chamber for containing said buoyant elements, (c) valve means for opening and closing said chamber at its top and bottom, (d) a pressurized air conduit communicating with the pressure chamber for admitting air under pressure thereto and maintaining said pressurized air in the chamber at a predetermined pressure at least equal to the water pressure at the depth of the submerged vessel to be raised for automatically causing said pressurized air to pass into the buoyant elements through said apertures until their internal and external pressures are approximately equal, (e) a passageway between the pressure chamber and the pressurized air conduit for passage of buoyant elements into the conduit, and (f) means conveying the buoyant elements into the submerged vessel while maintaining said pressures.

No references cited.

MILTON BUCHLER, *Primary Examiner.*

A. H. FARRELL, *Assistant Examiner.*